Oct. 15, 1963  J. A. BERTSCH  3,106,840
DYNAMIC TESTING MACHINE
Filed March 31, 1960  2 Sheets-Sheet 1
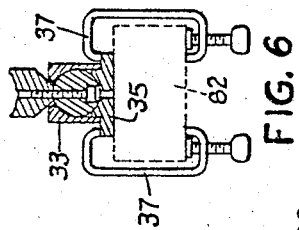
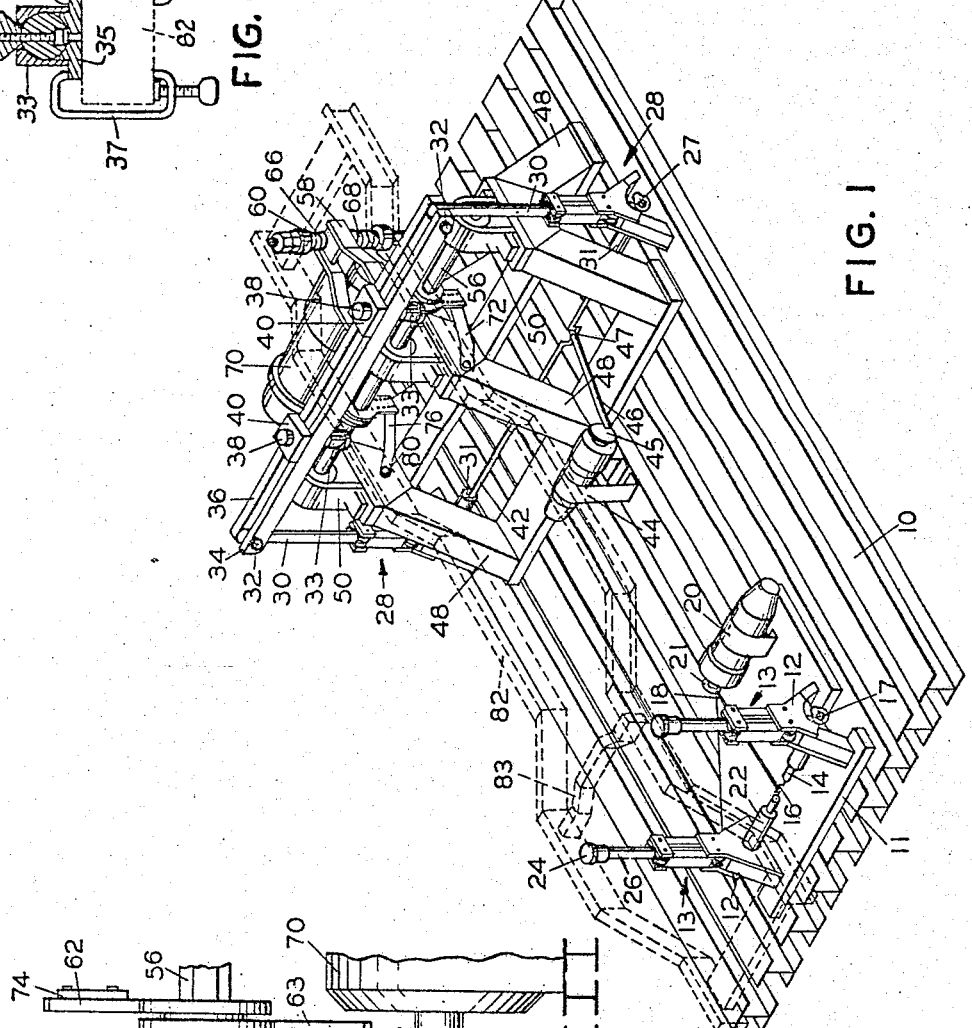
INVENTOR.
JOSEF A. BERTSCH
BY Walter E. Pavlick
ATTORNEY Oct. 15, 1963  J. A. BERTSCH  3,106,840
DYNAMIC TESTING MACHINE
Filed March 31, 1960  2 Sheets-Sheet 2
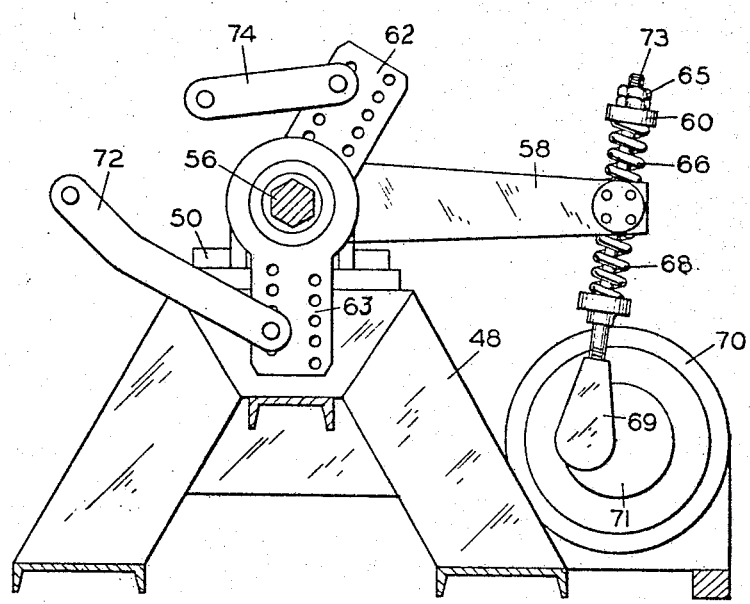
FIG. 4
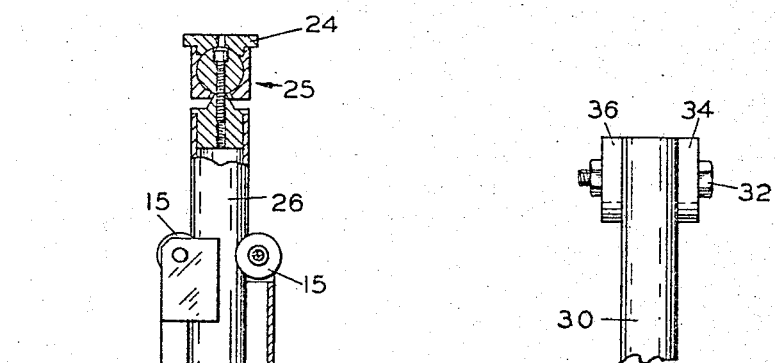
FIG. 2
FIG. 3
INVENTOR.
JOSEF A. BERTSCH
BY Walter E. Pavlich
ATTORNEY

United States Patent Office 3,106,840
Patented Oct. 15, 1963

3,106,840
DYNAMIC TESTING MACHINE
Josef A. Bertsch, Reading, Pa., assignor to Dana Corporation, Toledo, Ohio, a corporation of Virginia
Filed Mar. 31, 1960, Ser. No. 19,092
5 Claims. (Cl. 73—71.6)

This invention relates to testing machines in general and more particularly to automotive testing machines wherein a vehicle frame can be subjected to load conditions closely approximating those of actual road conditions.

The primary object of this invention is to provide an improved frame testing mechanism having means for imparting loads to a vehicle frame which simulate the actual loading of a frame mounted in a vehicle during actual road use.

Another object is to provide a structure composed of component parts which are adjustable relative to or independently of each other and are so positioned and so operated that vertical, transverse and fore and aft vibrations, bending and torsional loads are set up in a vehicle frame which is to be tested.

A further object of this invention is to provide means for imparting stresses and strains to a vehicle frame being tested in the same directions and of the same magnitude as would be created in a vehicle mounted frame due to the acceleration and deceleration of the vehicle.

Further objects and advantages will become apparent upon reading the following specification together with the accompanying drawings which form a part hereof.

In the drawings:

FIG. 1 is an oblique elevation view showing the component parts of a test stand embodying this invention.

FIG. 2 is an enlarged view of one of the cam operated pedestals.

FIG. 3 is an enlarged view of a portion of another cam operated pedestal.

FIG. 4 is an elevation of the rear shaft mechanism.

FIG. 5 is a partial end view of the rear shaft mechanism, and

FIG. 6 is an enlarged view of another portion of the pedestal of FIG. 3 showing the frame attached thereto.

To adequately test a vehicle frame it is desirable to subject the frame to the same loads and vibrations that it would encounter upon being installed in a vehicle. These loads are due to the "hop" or "tramp" phenomena of a vehicle. The "hop" phenomena describes the type of loads imposed on a frame when a wheel drops into a hole. The "tramp" phenomena describes the type of loading which occurs when the vehicle is passing over a washboard type surface. The latter phenomena produces forces which are out of phase with the balance of the suspension system and thus imposes severe vibrations to the frame. Further, the frame is subjected to torsional forces as when one wheel of a vehicle rolls over a bump or obstruction and lifts one corner of the frame.

The objects of such a test are to develop any inherent weaknesses in a frame construction to determine whether the component parts thereof are properly proportioned to withstand the stresses and strains to which they will be subjected and to determine if the material is of the proper grade and strength.

Formerly it was considered necessary to mount the frame in a vehicle and run the vehicle over a test track in order to determine the endurance of the frame and bring out any structural weakness therein.

In an attempt to eliminate the test run, prior art testing machines contemplated applying only vertical reciprocating movement at a plurality of points, as for example, by causing a pair of diagonally opposite supports to have upward movement while another pair have downward movement thus applying a torsional strain on a frame or body being tested.

The improved frame testing machine, as hereinafter described, has an arrangement that substantially reproduces all motions, loads, and vibrations in a frame on a test stand as would be produced as though the frame were built into a complete vehicle and run on a proving ground. The structure further permits complete visibility and accessibility of all parts of the frame during the test run.

A most significant point of this unit is its capacity to test a bare frame without any other part of the vehicle being assembled thereon. Frame prototypes for a new model vehicle series are usually ready long before the body and other parts. Therefore, with this improved structure the testing of the frame can be done many months in advance of actual complete vehicle proving grounds test and any gross deficiencies can be corrected.

Further, this unit is flexible enough to test a frame alone, a frame with suspension system, and a frame and body together with or without the engine in place. Also, parts or components of frames and components of such things as truck and trailer frames or other structures up to the limit of the testing machine size and capacity may be tested.

The improved structure, as here shown, comprises two main groups; i.e., four cams actuated pedestals for applying selected loads to the frame such as due to the "tramp" and "hop" phenomena and a crank operated shaft for simulating the loads due to acceleration and deceleration of a vehicle.

Referring now to the drawings and particularly FIG. 1, the testing machine is adjustably secured to a vibration damping base 10 of sufficient size and construction to afford satisfactory damping and provide for suitable adjustment. A pair of cam actuated pedestals 13 are adjustably secured to mounting plate 11 which is in turn adjustably secured to the damping base 10. These pedestals simulate the loads obtained from the front wheels of a vehicle. FIG. 2 shows a slidably mounted shaft 26 located in a frame 12 of each pedestal 13. The shaft 26 is free to reciprocate vertically within the pedestal guided by rollers 15. The upper end of each slidable shaft 26 terminates in a mounting bracket 24 which is movably attached to the end of the slidable shaft 26 by a ball and socket joint 25. The device to be tested is supported by and firmly secured to the mounting brackets 24 by any suitable fastening means, weights, or the weight of the device itself as shown in FIG. 1. The pedestal 13 loads the device by moving upwardly. When the cam 17 allows the shaft 26 to move downwardly, the weight of the device and any added weights induces the downward load. The slidable shafts 26 have cam followers 19 mounted at their lower ends and are actuated in vertical reciprocal movement by cams 17 which engage the shafts 26 at the cam followers. Each cam 17 is adjustably mounted on an end of each shaft 14 by any suitable means such as a series of keys 23 and can be replaced by cams of various sizes to impart a greater or lesser vertical reciprocal movement to the slidable shaft 26 and also can be adjusted circumferentially on the shaft 14 so that any desired phasing with respect to other cams mounted on the shaft can be obtained. The shaft 14 passes through, rotates within, and is supported by cylindrical housings 22 which are each fixedly mounted respectively, one to the base of each pedestal 13. The shaft 14 is provided integrally with a crank-shaped portion 16 in the area between the housings 22. A connecting rod 18 connects the crank portion 16 of shaft 14 to an eccentric location on drive plate 21. Drive plate 21 is moved rotationally by a variable speed mechanism 20 which is adjustably secured to mounting plate 11.

A second pair of cam actuated pedestals 28 are also adjustably mounted to damping base 10 and simulate some loads obtained from the rear wheels of the vehicle. This pair of pedestals 28 each contain a slidably mounted shaft 30 which shafts are free to reciprocate vertically in response to separate cams 27. Each cam 27 is adjustably and replaceably mounted respectively, one at each end of shaft 42 below slidable shafts 30. The shafts 30 are each provided with a cam follower 19 at the locations where the slidable shafts 30 engage the cams 27. These adjustably replaceable mounted cams 27 may be adjusted circumferentially so that any desired phasing can be obtained between the slidable shafts 30. The shaft 42 upon which the cams 27 are mounted extends between the pair of pedestals 28 and passes through, rotates within, and is supported by cylindrical housings 31 which are each fixedly mounted, respectively, one to the base of each pedestal. Shaft 42 is provided integrally with a crank-shaped portion 47 in the area between the housings 31. A connecting rod 46 secures the crank portion 47 of shaft 42 to an eccentric location on drive plate 45. Drive plate 45 is moved rotationally by a variable speed mechanism 44 which is adjustably secured to damping base 10. Since the pedestals 28 and the pedestals 13 are actuated by separate driving mechanisms, 44 and 20 respectively, they may be operated in any desired phase relationship and at different speeds.

In FIG. 3 we see the top portions of the slidably mounted shafts 30. Cross bars 34 and 36 are pivotally connected to the slidable shafts 30 by bolts 32. FIG. 1 shows that cross bars 34 and 36 join the top portions of the slidable shafts 30 of the cam actuated pedestals 28. Two loading shafts 38 are adjustably and pivotally secured to the cross bars 34 and 36 by brackets 40. The lower portion of each loading shaft 38 is terminated by a mounting bracket 33. These mounting brackets 33 are movably attached to the end of the loading shafts by ball and socket joints similar to those shown at 25.

The device to be tested is attached to mounting brackets 33 as shown in FIG. 6. More specifically the bracket 33 has a substantially flat bottom and is provided with a peripheral flange 35. The device to be tested abuttingly engages the bottom of the bracket 33 and is fixedly coupled thereto by means of suitable attaching means such as clamps 37 which engages the top of the flange 35 and the bottom of the frame 82. The loading shafts 38 induce a loading movement on the frame when moved upwardly against the resistance of the weight of the frame and whatever additional weights placed thereon if desired. When the cams 27 allow the shaft 38 to move downwardly, the weight of the frame 82 and any added weights move the frame downwardly and induce another loading movement. It is, therefore, apparent that the pedestals 13 and 28 support the frame 82 and can individually deform the same, and the portion of the frame 82 engaged by each respective pedestal 13 and 28 is subjected to loading movement relative to the balance of the frame and the support of the other pedestals.

FIGS. 1, 4 and 5 show a third mechanism for inducing stresses into the tested device. A shaft 56 simulates the loads caused by rotation of the rear axle of the vehicle. Adjustably mounted thereon are two pairs of lever arms 61, 62 and 63, 64, one pair on either end of shaft 56, and to each arm there is pivotally and adjustably attached a control bar; bar 72 on arm 63, bar 74 on arm 62, bar 76 on arm 64 and bar 78 on arm 61. The control bars are pivotally secured at selected locations to the device to be tested, normally at the spring mounting bosses 80 of the frame 82 being tested, which bosses are disposed fore and aft of the loading shafts 38. During acceleration and braking of a vehicle, the rear axle tends to rotate relative to the vehicle and in doing so imposes bending loads upon the frame thereof through the medium of its spring connection therewith. By reciprocally rotating the shaft 56 the control bars 72, 74, 76 and 78, which connect the control arms 61, 62, 63 and 64 to the spring mounting bosses 80, will induce deforming loads to the frame 82 which simulate the loads induced to the frame by the axle during acceleration and deceleration. These deforming loads bend the side rails of the frame 82 relative to the shafts 26 and 38, which support and loadingly engage the frame, and since the brackets 33 are pivotally attached to the shafts 38, the frames fixed attachment thereto does not interfere with the deforming loads imposed by the movement of the shaft 56. However, even if the brackets 33 were not pivotally mounted and were fixed relative to loading shafts 38, the shaft 56 could still impose loads to the frame 82 by deforming the same relative to the attaching means and since the attachment of the brackets 33 is preferably at a location where the frame 82 is normally attached to the vehicle body (not shown) this last type of frame deformation tests this attachment location.

Shaft 56 is supported in three locations by pillow blocks 50, one at each end and one in the center, these pillow blocks 50 are in turn each supported by its respective base 48. One end of a rocker arm 58 is attached to the shaft 56, the other end is provided with a hole through which a connecting rod 69 passes. Connecting rod 69 is adjustably and pivotally attached to rocker arm 58 by springs 66 and 68. The end of connecting rod 69 is provided with threads 73 so that the compression on springs 66 and 68 can be adjusted by washer 60 and adjusting nut 65. The connecting rod 69 is attached to a shaft with a crank type arrangement 71.

The shaft with the crank arrangement is moved rotatably by a variable speed mechanism 70. The chain of movement, from the variable speed mechanism 70 to the crank shaft 71 to the attached connecting rod 69 and to the rocker arm 58, imparts a reciprocal rotational or oscillatory motion to shaft 56 which in turn imparts reciprocal motion to the lever arms 61, 62, 63 and 64 and therethrough to the control bars 72, 74, 76 and 78. The direction of the reciprocal movement of the control bars may be varied within a vertical plane by repositioning the connection between the lever arms and the shaft 56, the lever arms and the control bars, and the control bars and frame 82.

In operation, the vehicle frame 82 is mounted upon the testing machine. The four cam actuated pedestals 13 and 28 support the frame and apply the loads which result from the selected motion such as tramping, hopping or twisting, to the frame by moving reciprocally. The brackets 24 of the pedestals 13 engage the frame 82 adjacent a front axle mounting means 83 carried by the frame. The control bars 72, 74, 76 and 78, actuated reciprocally by shaft 56 impart loads to frame 82 simulating the loading that would be created by the acceleration and deceleration of the vehicle. These loads can be in phase, out of phase, or in and out of phase in a cyclic manner. Springs 66 and 68 in addition to attaching connecting rod 69 to rocker arm 58 afford a movable loaded attachment so that when the loads are applied to the frame by the cam operated pedestals, the control bars do not resist this loading since the springs will compress and allow the control bars to move with the load applied by the pedestals. Thus, both the pedestals and the control bars are able to simultaneously impart loads to the frame. In addition, these springs 66 and 68 are calibrated so that a maximum desired load of variable amplitude will be automatically applied by the crank shaft 69. A crank shaft setting which would result in excessive deflection is used at the start of the test; however, by using the precalibrated springs 66 and 68 the actual load induced into the frame is limited by the springs. In this manner any permanent deformations or failures in the frame do not result in a loss of test load, for the springs will allow the crank shaft to impart greater deflections until the preselected spring load is again attained. If desired, loads equal to the weight of the car body, passengers and luggage can be imposed on the frame body brackets during the test. These loads can be imposed by weights, springs or any other suitable means.

From the foregoing, it is now apparent that a dynamic testing machine has been provided which simulates the loads a vehicle frame will encounter under actual field testing conditions.

The preferred embodiment of the invention has been illustrated and described, but changes and modifications can be made, and it is to be understood that this showing and description is illustrative only and not for the purpose of rendering my invention as limited to the details illustrated or described, except insofar as I have limited them by the terms of the following claims.

What is claimed is:

1. A mechanism for imposing acceleration and deceleration load effects to a vehicle frame having axially spaced axle attachment means comprising, a rotatably mounted shaft, a pair of lever arms adjustably secured to said shaft for rotation therewith, a pair of connecting means with one adjustably attached to each of said lever arms and connected to the axle attachment means of said frame, supporting means engaging said frame and positioning the same relative to said connecting means whereby said connecting means are operable to deformingly load said frame relative to said supporting means, said last named means being disposed in a plane interposed between the connections between said connecting means and said attachment means, a rocker arm secured to said shaft, driving means, a power crank mechanism connected by said driving means to said rocker arm and actuating the same to reciprocate said connecting means and deform said frame relative to said supporting means, and spring means connecting said driving means to said rocker arm and applying a constant predetermined load thereto regardless of the deformation of said frame.

2. A mechanism for imposing acceleration and deceleration load effects on a vehicle frame having a pair of axially spaced axle attachment means comprising, a rotatably mounted shaft, a plurality of lever arms adjustably secured to said shaft for rotation therewith, connecting means connecting each of said lever arms to one of the pair of axle attachment means of said frame, a plurality of supporting means positioning said frame relative to said connecting means whereby said connecting means are operable to deformingly load said frame relative to said supporting means, at least one of said supporting means being positioned in a plane lying intermediate the pair of attaching means, a rocker arm having a first end firmly secured to said shaft and a second end provided with an opening and being operable to reciprocally rotate said shaft, a driving means, a power crank mechanism connected by said driving means to said rocker arm and reciprocating said rocker arm and reciprocally rotating said shaft, and deforming said frame relative to said supporting means, said driving means including a connecting rod having one end extending through and slidably received in said opening and a second end drivingly connected to said crank mechanism, and a pair of spring means one positioned on each side of said rocker arm and abuttingly engaging the same and said connecting rod whereby said connecting rod applies a constant predetermined load to said rocker arm regardless of the deformation of the frame.

3. In a machine for testing the frame of a vehicle having a pair of axially spaced wheel and driving axle attaching means the combination comprising a plurality of support means each including one of a plurality of first shaft means slidably mounted therein, said first plurality of shaft means each having engaging means thereon engaging and supporting said frame, means reciprocally moving each of said first plurality of shaft means and imparting loading movement to said frame, the phase of each of said last named means being adjustable whereby said plurality of shaft means operate in desired phase relationship, said engaging means engaging said frame at positions to impose loads and support thereto simulating those imposed by the wheels of a vehicle with at least one of said engaging means engaging said frame in a plane intermediate the pair of axially spaced driving axle attaching means so that the loads and support rendered thereby simulates that of the driving axle, a rotatably mounted second shaft means, a plurality of lever arms adjustably secured to said second shaft means and oscillated thereby, connecting means connecting each of said lever arms to one of the pair of driving axle attaching means of the frame, positioning means including said support means positioning said frame relative to said connecting means whereby the same may load said frame, a rocker arm firmly secured to said second shaft means causing reciprocal rotary movement thereof, said reciprocal rotary movement of said second shaft means imposing deforming loads to the frame and deflecting the same relative to said support means thereby imposing loads on the frame simulating those caused by acceleration and deceleration of a vehicle, a variable speed mechanism actuating said rocker arm, and resilient means of variable length connecting said variable speed mechanism to said rocker arm and applying a predetermined constant maximum load of automatically variable amplitude to the frame regardless of the deformation of the same, said first and second shaft means operating in a selected phase relationship thereby imposing complex loads to the frame and testing the same under operating conditions.

4. In a machine for testing a frame of a vehicle adapted to have a first and a second wheel and axle assembly mounted thereon, and having a first mounting means for mounting said first wheel and axle assembly and a pair of axially spaced second mounting means for mounting the second wheel and axle assembly, the combination comprising a first plurality of members supportingly engaging said frame and adapted to individually impose vertical loads thereto, at least one of said plurality of members engaging said frame in the vicinity of said first mounting means and imposing loads and support to the frame simulating the loads and support from the wheels of the first wheel and axle assembly, at least a second of said plurality of members engaging said frame at a position lying in a plane interposed between said pair of second mounting means and imposing loads and support to the frame simulating the loads and support from the wheels of the second wheel and axle assembly, means for individually driving each of said first plurality of members, the phase of said driving means being adjustable whereby the loading phase relationship of each of said first plurality of members is determinable whereby loads may be imposed on the frame which simulate loads arising from the wheel engagement with road irregularity, a rotatable member, a pair of members secured to said rotatable member for rotation therewith and each connected to one of the pair of second mounting means of said frame whereby said connections are in spaced-apart relationship with one connection on either axial side of said second of said first plurality of members, and means reciprocally rotating said rotatable member and reciprocating said pair of members and imposing deforming loads to the frame relative to the support supplied by said first plurality of members thereby simulating loads on said frame caused by the axle during acceleration and deceleration.

5. A mechanism for applying deforming stress to a test specimen, which test specimen has a longitudinal axis and has a first and a second attachment means thereon, said attachment means being spaced and substantially aligned in the direction of said longitudinal axis, comprising in combination a shaft having an axis disposed transversely relative to the longitudinal axis of the test specimen and spaced therefrom, means mounting said shaft for reciprocal rotation about said transverse axis, said attachment means lying in a plane parallel to said shaft, a first and a second adjacent member mounted on said shaft for unitary reciprocal rotation therewith and extending radially therefrom in an angular relationship, said members lying on opposite sides of a plane which is normal to said parallel plane and intersects said transverse axis of said shaft, means securing said first and second members to said first and second attachment means respectively whereby said members are secured to said test specimen at locations which are spaced in the direction of said longitudinal axis, a plurality of means for positioning said test specimen relative to said members and restraining said test specimen from reciprocally rotating unitarily with said shaft with at least one positioning means of said plurality of positioning means being disposed intermediate said attachment means so that said members in rotating unitarily with said shaft urge the test specimen to rotate unitarily with said shaft and thereby deform the test specimen relative to said positioning means, and driving means reciprocally rotating said shaft thereby oscillating said members to deform said specimen, rotation of said shaft in one direction moving said first member to pull and said second member to push said test specimen while rotation in the opposite direction moves said second member to pull and said first member to push said test specimen, said driving means including resilient variable length, constant maximum load applying means applying a predetermined maximum load of variable amplitude on said members regardless of the deformation of the test specimen whereby the pushing and pulling load on said test specimen remains at a constant maximum level.

References Cited in the file of this patent

UNITED STATES PATENTS

| | | |
|---|---|---|
| 2,293,832 | Kroll | Aug. 25, 1947 |
| 2,438,755 | Larsen | Mar. 30, 1948 |
| 2,890,584 | Dickie | June 16, 1959 |

FOREIGN PATENTS

| | | |
|---|---|---|
| 787,515 | Great Britain | Dec. 11, 1957 |